May 15, 1928.  
J. R. GAMMETER  
MOLDING APPARATUS  
Filed June 15, 1926  
1,669,704  
2 Sheets-Sheet 2
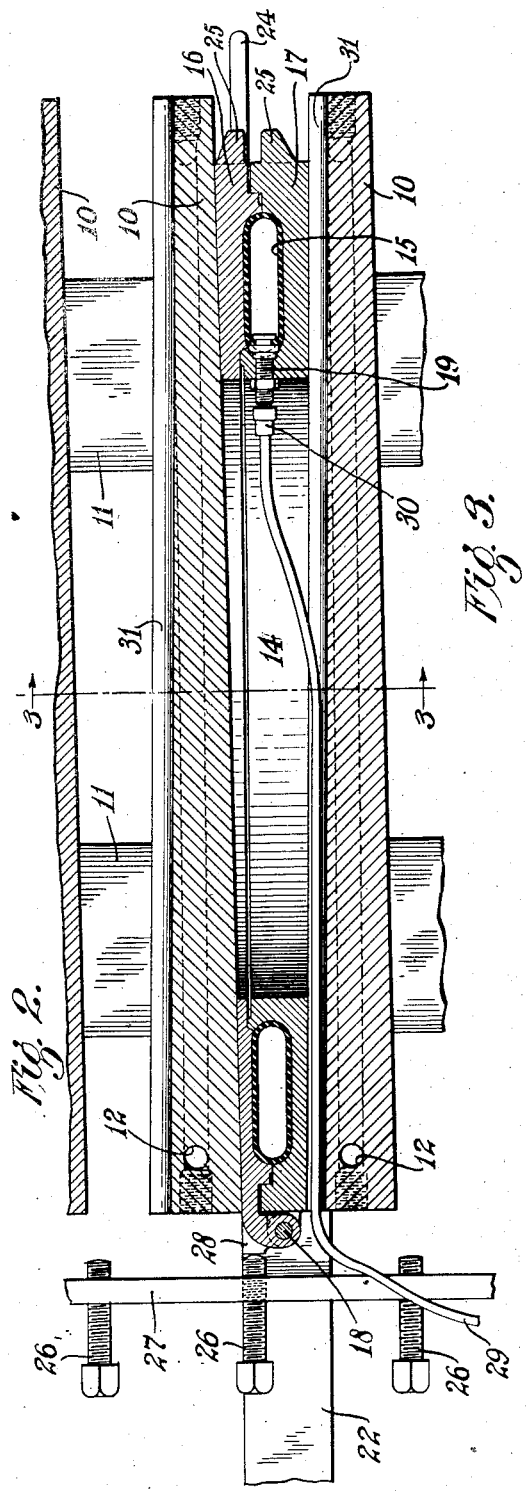
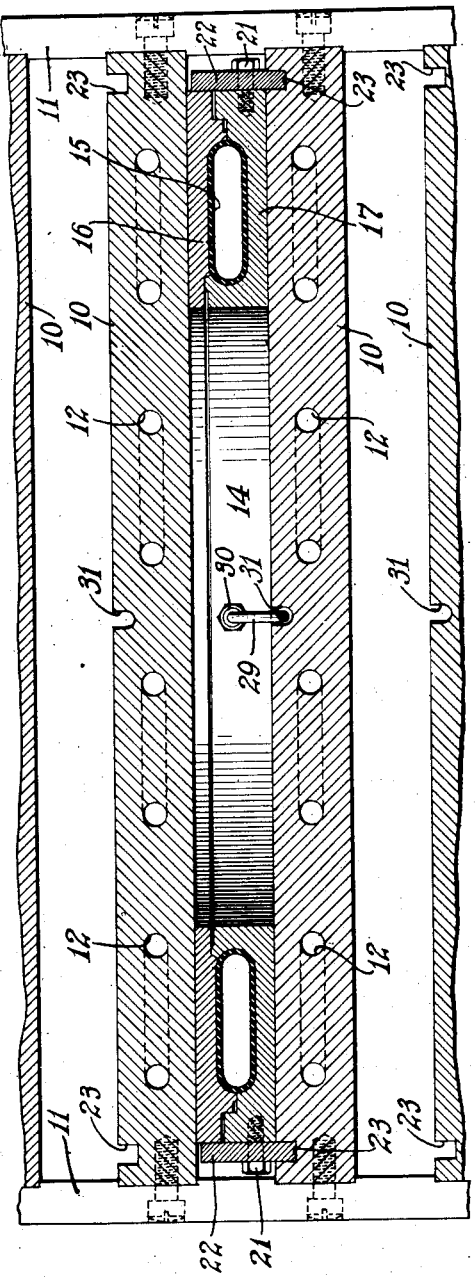
Inventor  
John R. Gammeter  
By Pierson, Eakin & Avey  
Attys Patented May 15, 1928.

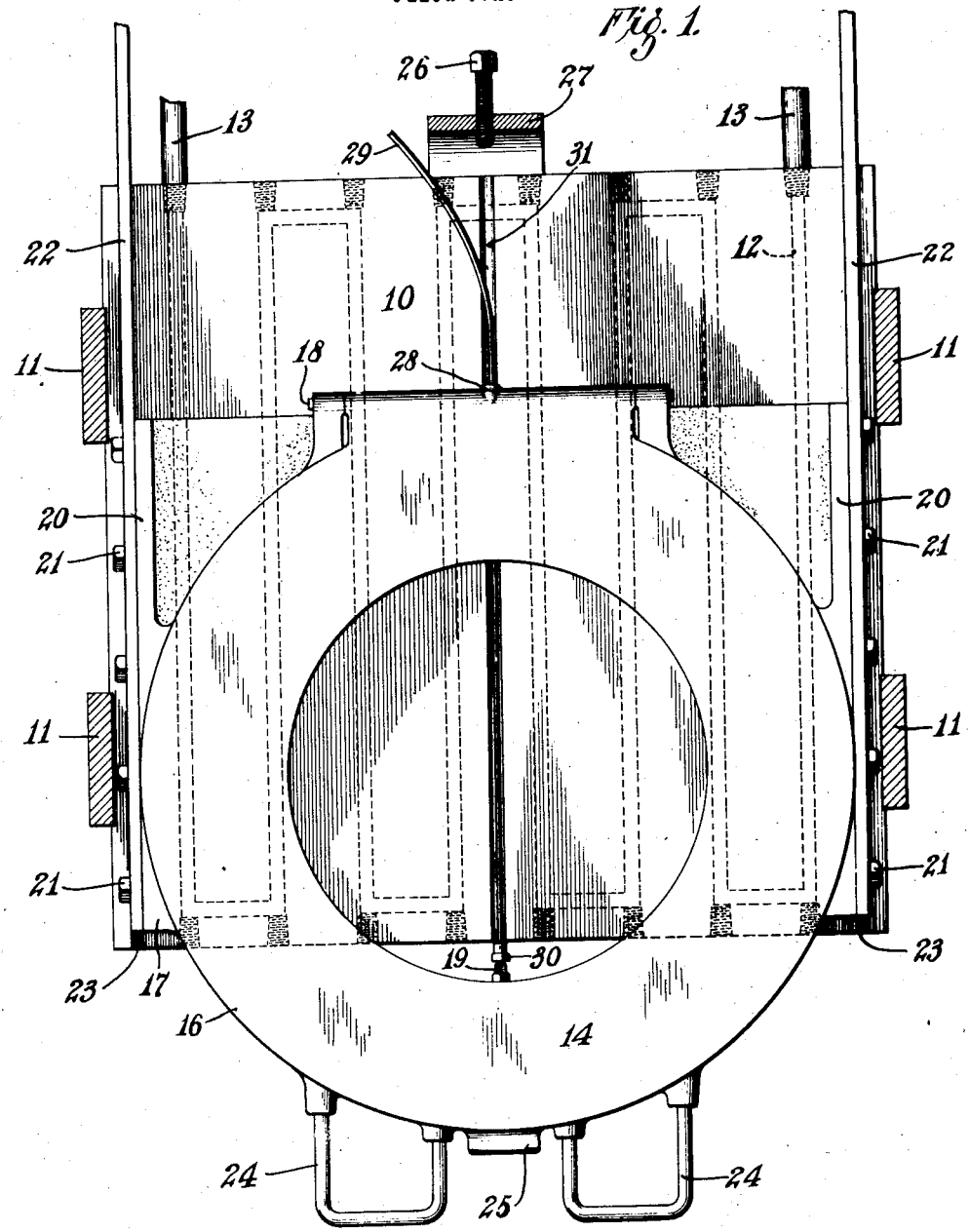

1,669,704

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

MOLDING APPARATUS.

Application filed June 15, 1926. Serial No. 116,118.

This invention relates to molding apparatus and especially to apparatus for molding hollow articles under internal fluid pressure.

My chief objects are to provide economy of construction and operation. A more specific object is to provide improved apparatus for molding and vulcanizing hollow rubber articles wherein a series of molds may be mounted in a vulcanizer and individual molds may be removed therefrom for removing and inserting the work without relieving the pressure on the other molds, so that no more than one mold of the series need be out of vulcanizing service at any time. A further object is to provide molding and vulcanizing apparatus of this type wherein the mold sections conveniently may be held closed without the use of a ram and by the employment of simple and easily operated means. Another object is to provide means for holding the mold sections closed such that comparatively thin mold sections may be used, for economy of space and for effective heat transfer.

Of the accompanying drawings:

Fig. 1 is a horizontal section of apparatus embodying my invention in its preferred form, parts comprising a mold and a mold-supporting platen being shown in full plan view.

Fig. 2 is a vertical longitudinal section through a part of the same, with the work therein, the mold being in vulcanizing position.

Fig. 3 is a section on line 3—3 of Fig. 2.

Referring to the drawings, 10, 10 are adjacent platens of a heater or vulcanizer, which preferably comprises an extended series of such platens supported in spaced relation by upright supporting bars 11, 11. The platens are formed with steam passages 12, 12 and are provided with pipe connections 13, 13 for admitting and venting steam therefrom, to heat the platens to vulcanizing temperature.

Each of the platens 12 is uniformly tapered, in thickness, from its rear margin to its front margin, so that each of the spaces between adjacent platens is reversely tapered, as shown in Fig. 2, and adapted to receive a complementally tapered mold, such as the mold 14, each mold and the adjacent platens interfitting in wedging relation.

The mold 14 is herein shown, for the purpose of illustration, as an inner tube mold for a transversely-flattened inner tube 15, and comprises an annular upper member 16 and an annular lower member 17 hinged together at 18 at the rear of the mold, said members between them defining an annular molding cavity for the inner tube, and the lower member 17 having its inner wall apertured at the front of the mold to accommodate the valve-stem 19 of the tube.

The lower mold member 17 is formed with tangentially-disposed, parallel, lateral flanges 20, 20 to which are secured, by bolts 21, 21, respective rearwardly-extending runners 22, 22, the latter extending below the bottom face of the mold member 17 as shown in Fig. 3 and slidably fitting within runways 23, 23 formed in the upper face of the platen 10, from the front to the rear margin thereof. The height of the runners is such that they traverse the meeting plane of the mold members at the sides thereof, so as to guide the upper mold member accurately into registry with the lower member while the mold is being closed, and such that their top faces are adapted to contact with the bottom face of the overlying platen 10 when the mold is pulled out from between the platens for loading and unloading, so that the runners will support the mold substantially in horizontal position after it has been drawn forward between the platens.

Each upper mold member 16 is provided on its front side with a pair of handles 24, 24 by which the mold may be engaged to draw it from between the platens of the vulcanizer, and for raising the upper mold member to remove a vulcanized article and mount an unvulcanized one therein. Between handles each member of the molds is formed with a radial lug 25, the lugs of each mold being spaced apart from each other to permit the insertion therebetween of a mold-opening tool.

For initiating the forward movements of the molds, should they become too firmly wedged between the platens, I provide set-screws 26, 26 threaded through a bracket 27 at the rear of the vulcanizer opposite respective mold-receiving spaces, said screws being adapted to be forced against bosses such as the boss 28 formed on the hinge portions of the respective upper mold members 16.

For conducting inflating or vulcanizing fluid into the articles to be vulcanized, flexible fluid-conducting pipes, such as the pipe 29, are provided, each having a terminal coupling 30 for attachment to the valve stems 19 of the tubes 15, and each platen is formed in its upper face with a central groove or channel 31 extending from its front to rear margin to accommodate the pipe 29 while permitting the mold to be slid into and out of position between the platens. The pipes 29 may be connected with a common supply-manifold (not shown).

The mode of operation and the advantages of the apparatus will be manifest from the foregoing description.

My invention is susceptible of modification within the scope of the appended claims, and I do not wholly limit it to the specific construction shown.

I claim:

1. Molding apparatus comprising a pair of spaced-apart, stationarily-mounted platens defining a mold-receiving space and a mold adapted to seat in said space, the said mold consisting of two mating mold sections constituting a substantially complete enclosure of a mold cavity.

2. Apparatus as defined in claim 1 including means for conducting a pressure fluid into a hollow article contained in the mold.

3. Molding apparatus comprising heating means defining a tapered, mold-receiving space, a mold having complementally-tapered faces adapted to be wedged into said space, and means for distending a hollow article contained in the mold, the said mold consisting of two mating mold sections constituting a substantially complete enclosure of a mold cavity.

4. Molding apparatus comprising a series of spaced-apart heated platens defining a plurality of tapered mold-receiving spaces, and a set of complementally-tapered molds adapted to seat in the said spaces, each of the said molds consisting of two mating mold sections constituting a substantially complete enclosure of a mold cavity.

5. Molding apparatus comprising a heating element and a mold element adapted to be assembled in wedging relation, and means associated therewith and adapted to provide a mechanical advantage for initiating a separating movement between said elements, the said mold element consisting of two mating mold sections constituting a substantially complete enclosure of a mold cavity.

6. Molding apparatus comprising heating means defining a mold-receiving space, a mold adapted to be seated in said space with a wedging action, and means for guiding the mold into and out of the said space and for supporting it outside of the same, the said mold consisting of two mating mold sections constituting a substantially complete enclosure of a mold cavity.

7. Molding apparatus as defined in claim 6 in which the mold-supporting means comprises a pair of elongated runners operatively connecting the mold and the heating element.

8. Molding apparatus comprising a heating element and a molding element adapted to be assembled in wedging relation, and means for conducting fluid to the interior of said molding element, the said mold consisting of two mating mold sections constituting a substantially complete enclosure of a mold cavity.

9. Molding apparatus comprising spaced-apart platens defining a mold-receiving space, a mold adapted to be wedged into said space, and a flexible pipe for conducting fluid to the interior of said mold, one of said platens being formed with a channel accommodating said pipe.

In witness whereof I have hereunto set my hand this 7th day of June, 1926.

JOHN R. GAMMETER.